(12) United States Patent
Beaulieu et al.

(10) Patent No.: US 12,723,935 B2
(45) Date of Patent: Sep. 1, 2026

(54) SYSTEMS AND DEVICES FOR SHEAR FORCE ESTIMATION WITH OFF-AXIS MEMBRANE PRESSURE MEASUREMENT

(71) Applicant: Toyota Research Institute, Inc., Los Altos, CA (US)

(72) Inventors: Andrew M. Beaulieu, Somerville, MA (US); Alexander Alspach, Somerville, MA (US)

(73) Assignee: Toyota Research Institute, Inc, Los Altos, CA (US)

( * ) Notice: Subject to any disclaimer, the term of this patent is extended or adjusted under 35 U.S.C. 154(b) by 1170 days.

(21) Appl. No.: 17/724,580

(22) Filed: Apr. 20, 2022

(65) Prior Publication Data

US 2023/0341279 A1 Oct. 26, 2023

(51) Int. Cl.
*G01L 5/00* (2006.01)
*B25J 13/08* (2006.01)
*G01L 1/14* (2006.01)

(52) U.S. Cl.
CPC ............. *G01L 5/009* (2013.01); *B25J 13/084* (2013.01); *G01L 1/146* (2013.01)

(58) Field of Classification Search
CPC ......... B25J 13/084; G01L 5/009; G01L 1/146
See application file for complete search history.

(56) References Cited

U.S. PATENT DOCUMENTS 8,613,231 B2 12/2013 Muroyama et al.
9,250,142 B2 * 2/2016 Fukuzawa .............. H04R 19/04
10,038,854 B1 7/2018 Cooper et al.
10,209,830 B2 * 2/2019 Pedder ...................... G01L 5/00
2011/0051123 A1 * 3/2011 Kunigami .............. G01L 5/166 702/42
2019/0285493 A1 * 9/2019 Pounds .................. B64D 45/00
2019/0328280 A1 10/2019 Hammerberg
2020/0200623 A1 6/2020 Choi et al.
2020/0278283 A1 9/2020 Pevnyi et al.

FOREIGN PATENT DOCUMENTS

EP 2490004 A1 * 8/2012 ........... G06F 3/0414
JP 2008281403 A * 11/2008 ............ B25J 13/082
WO 2015143307 A1 9/2015

* cited by examiner

*Primary Examiner* — Octavia Hollington
(74) *Attorney, Agent, or Firm* — Dinsmore & Shohl LLP

(57) ABSTRACT

In accordance with one embodiment of the present disclosure, a sensor system includes a sensing surface and an array of pressure sensors arranged on the sensing surface. The array of pressure sensors includes at least one pressure sensor is parallel to the sensing surface, at least one pressure sensor is angled between parallel and perpendicular to the sensing surface, and at least one pressure sensor is perpendicular to the sensing surface. The pressure sensors are micro electro mechanical system (MEMS) barometric pressure sensors.

20 Claims, 6 Drawing Sheets

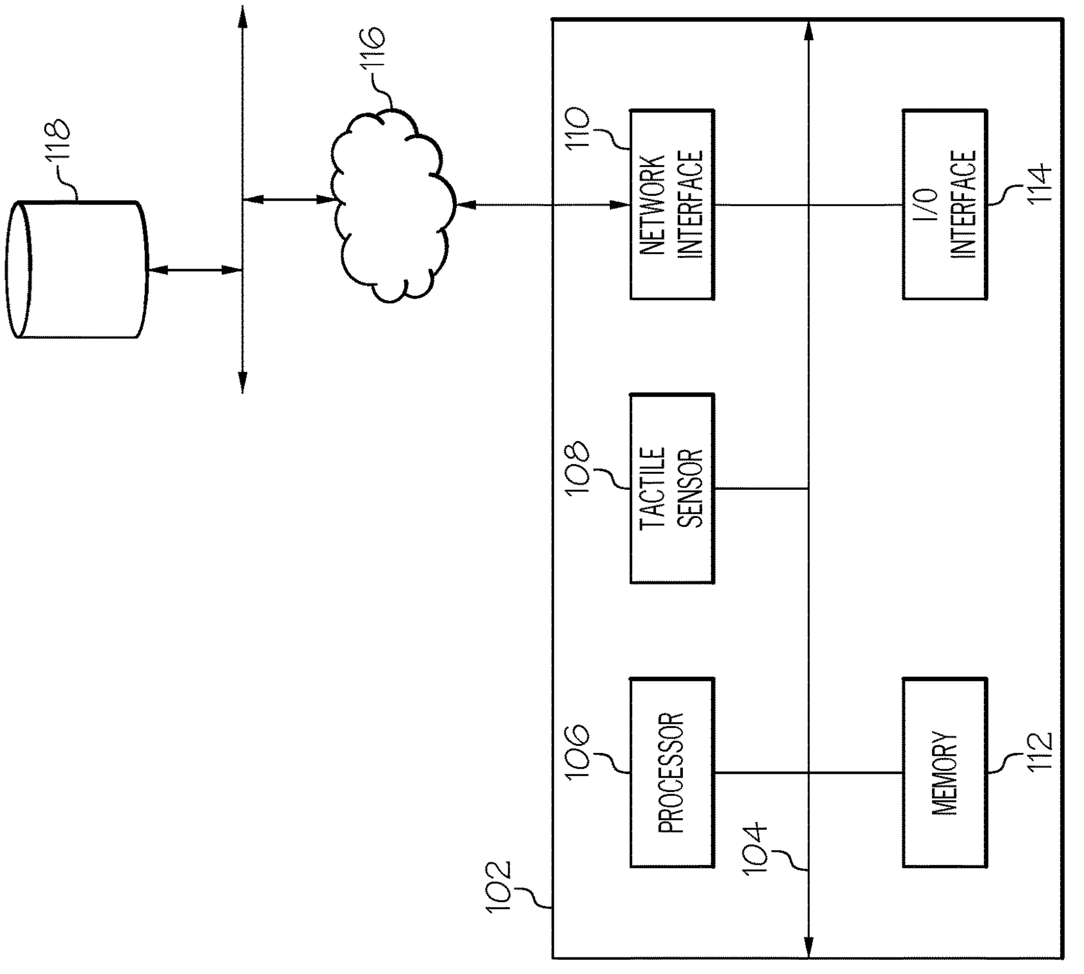
FIG. 1
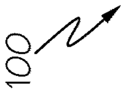

SYSTEMS AND DEVICES FOR SHEAR FORCE ESTIMATION WITH OFF-AXIS MEMBRANE PRESSURE MEASUREMENT

TECHNICAL FIELD

The present disclosure relates to sensors, and more particularly to sensors for estimating shear force.

BACKGROUND

Robotic arms may be used to perform object manipulation tasks that humans typically perform. A variety of challenges are presented in adapting a robotic arm to manipulate an object, including how a robotic arm is to grasp an object. If an object is grasped too firmly, the object may be damaged. If an object is grasped too softly, the object may slip away from the grasp. It is thus important for a robotic arm to know whether an object is slipping to properly grasp the object.

Tactile sensors can be used to monitor object interactions with the robotic arm. However, many tactile sensors are complex or expensive. Micro electro-mechanical system (MEMS) barometric sensors, on the other hand, are simple and inexpensive. MEMS are a class of systems that have both electrical and mechanical components incorporated on a single chip. MEMS barometers are used to create a pressure sensor sensitive enough to deliver 1-gram of sensitivity at a low cost yet still be durable enough to withstand 25-pounds of force. Despite their benefits, MEMS barometric pressure sensors can only estimate a force normal to the surface.

Therefore, efficient strategies for estimating shear force with MEMS barometric pressure sensors are desired.

SUMMARY

In accordance with one embodiment of the present disclosure, a sensor system includes a sensing surface and an array of pressure sensors arranged on the sensing surface. The array of pressure sensors includes at least one pressure sensor parallel to the sensing surface, at least one pressure sensor angled between parallel and perpendicular to the sensing surface, and at least one pressure sensor perpendicular to the sensing surface. The pressure sensors are micro electro mechanical system (MEMS) barometric pressure sensors.

In accordance with another embodiment of the present disclosure, a robotic arm includes a sensing surface and an array of pressure sensors arranged onto the sensing surface. The array of pressure sensors includes at least one pressure sensor parallel to the sensing surface, at least one pressure sensor angled between parallel and perpendicular to the sensing surface, and at least one pressure sensor perpendicular to the sensing surface. The pressure sensors are micro electro mechanical system (MEMS) barometric pressure sensors.

In accordance with yet another embodiment of the present disclosure, an end effector includes a sensing surface and an array of pressure sensors arranged onto the sensing surface. The array of pressure sensors includes at least one pressure sensor parallel to the sensing surface, at least one pressure sensor angled between parallel and perpendicular to the sensing surface, and at least one pressure sensor perpendicular to the sensing surface. The pressure sensors are micro electro mechanical system (MEMS) barometric pressure sensors. The array of pressure sensors is encapsulated onto the sensing surface such that the array of pressure sensors is encapsulated in a single piece of material having a first surface connected to the sensing surface and a second surface.

Although the concepts of the present disclosure are described herein with primary reference to robotic arms, it is contemplated that the concepts will enjoy applicability to any device utilizing tactile sensing.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 1 depicts a system including a sensor device, according to one or more embodiments shown and described herein;

DETAILED DESCRIPTION

Figure 2B:
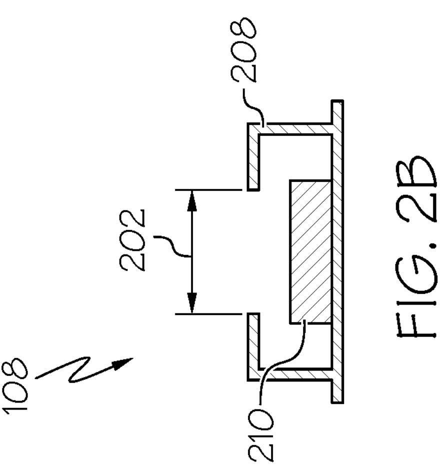
FIG. 2B depicts a cutaway side view of the tactile sensor of FIG. 1, according to one or more embodiments shown and described herein.

The embodiments disclosed herein include systems and devices for shear force estimation with off-axis membrane pressure measurement. In embodiments disclosed herein, sensors may be placed at key angles or perpendicular to a sensing surface to detect and/or measure shear forces that conventional pressure sensors cannot detect. For example, the embodiments may include a plurality of pressure sensors arranged on a sensing surface including a first set of sensors, a second set of sensors, a third set of sensors, and others. The first set of sensors may measure forces normal to the surface, the second set of sensors may measure normal and shear forces, and the third set of sensors may measure forces parallel to the surface (i.e., shearing forces).

Referring now to FIG. 1, a sensor system 100 including a sensing device 102 is depicted. The sensor system 100 may include a sensing device 102 having computing components including a processor 106, a memory module 112, a network interface 110, an input/output interface (I/O interface 114), and tactile sensors 108. The sensing device 102 also may include a communication path 104 that communicatively connects the various components of the sensing device 102. The sensing device 102 may connect to external devices 118 via a network 116. It should be understood that the components of the sensor system 100 and the sensing device 102 described are exemplary and may contain more or less than the number of components shown.

The processor 106 may include one or more processors that may be any device capable of executing machine-readable and executable instructions. Accordingly, each of the one or more processors of the processor 106 may be a controller, an integrated circuit, a microchip, or any other computing device. The processor 106 is coupled to the communication path 104 that provides signal connectivity between the various components of the sensing device 102. Accordingly, the communication path 104 may communicatively couple any number of processors of the processor 106 with one another and allow them to operate in a distributed computing environment. Specifically, each processor may operate as a node that may send and/or receive data. As used herein, the phrase "communicatively coupled" means that coupled components are capable of exchanging data signals with one another, such as, e.g., electrical signals via a conductive medium, electromagnetic signals via air, optical signals via optical waveguides, and the like.

The communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 112 is communicatively coupled to the communication path 104 and may contain one or more memory modules comprising RAM, ROM, flash memories, hard drives, or any device capable of storing machine-readable and executable instructions such that the machine-readable and executable instructions can be accessed by the processor 106. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 112. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory module 112 may also include instructions for performing supervised methods to train a machine learning model based on labeled training sets, wherein the machine learning model is a decision tree, a Bayes classifier, a support vector machine, a convolutional neural network, and/or the like. The memory module 112 may also or instead include instructions for performing unsupervised machine learning algorithms, such as k-means clustering, hierarchical clustering, and/or the like.

The I/O interface 114 is coupled to the communication path 104 and may contain hardware for receiving input and/or providing output. Hardware for receiving input may include devices that send information to the processor 106. For example, a keyboard, mouse, scanner, touchscreen, and camera are all I/O devices because they provide input to the processor 106. Hardware for providing output may include devices from which data is sent. For example, an electronic display, speaker, and printer are all I/O devices because they output data from the processor 106.

The sensing device 102 may also comprise the network interface 110. The network interface 110 is communicatively coupled to the communication path 104. The network interface 110 can be any device capable of transmitting and/or receiving data via a network or other communication mechanisms. Accordingly, the network interface 110 can include a communication transceiver for sending and/or receiving any wired or wireless communication. For example, the network interface 110 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The network interface 110 communicatively connects the sensing device 102 to external systems, such as external devices 118, via a network 116. The network 116 may be a wide area network, a local area network, a personal area network, a cellular network, a satellite network, and the like.

The sensor system 100 may also include external devices 118. The external devices 118 may be one or more computing devices that may be in remote communication with the sensing device 102 via network 116. The external devices 118 may include desktop computers, laptop computers, smartphones, and any other type of computing device in communication with the sensing device 102 to operate the sensing device 102. The external devices 118 may also include services that operate beyond the sensing device 102 that may be utilized by or may utilize the sensing device 102, such as external databases, storage devices, computing platforms, and any other type of service.

The tactile sensors 108 may be one or more sensors communicatively coupled to the processor 106. The tactile sensors 108 are MEMS barometric pressure sensors (also referred to as "MEMS barometers"). MEMS are a class of systems with electrical and mechanical components incorporated on a single chip. Accordingly, MEMS barometers are used to create a pressure sensor sensitive enough to deliver 1-gram of sensitivity at a low cost yet still be durable enough to withstand 25-pounds of force. The tactile sensors 108 will be discussed in more detail with regard to FIGS. 2A-2D.

It should be understood that the components illustrated in FIG. 1 are merely illustrative and are not intended to limit the scope of this disclosure. More specifically, while the components in FIG. 1 are illustrated as residing within sensing device 102, this is a non-limiting example. In some embodiments, one or more of the components may reside external to sensing device 102, such as with one or more external devices 118.

Figure 2D:
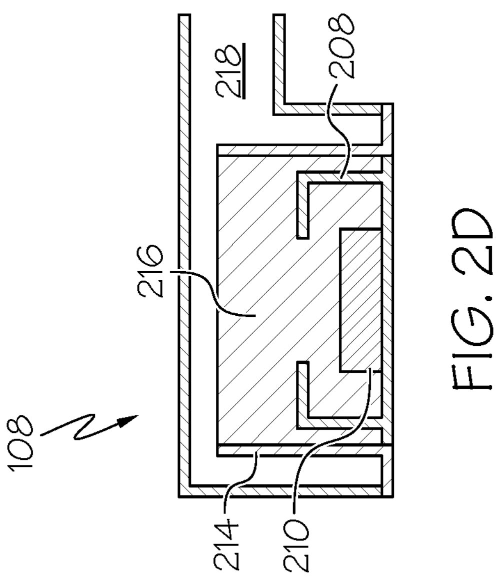
FIG. 2D depicts another cutaway side view of the tactile sensor of FIG. 1 formed in the outer material, according to one or more embodiments shown and described herein.
Figure 2A:
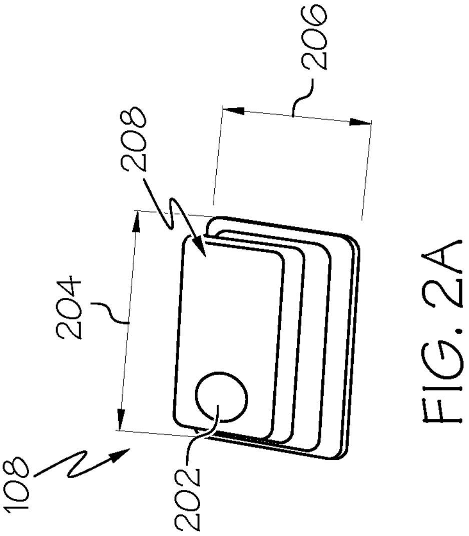
FIG. 2A depicts the tactile sensor of FIG. 1, according to one or more embodiments shown and described herein.

Referring now to FIG. 2A, the tactile sensor 108 of FIG. 1 is depicted. The tactile sensor 108 may comprise one or more tactile sensors shown in FIG. 2A. The tactile sensor 108 is a MEMS barometric pressure sensor that may be easily and cheaply manufactured. The small form factor of the tactile sensor 108 also makes it useful for tactile sensing in robotic environments. As a non-limiting example, an individual tactile sensor 108 may have a width 204 of 5 mm and a length 206 of 3 mm; however, embodiments are not limited by any particular dimensions. The exterior of the example tactile sensor 108 contains a casing 208. The casing 208 may be made of metal, plastic, and/or any other solid material for protecting the internal components of the tactile sensor 108, particularly when large forces are applied to the tactile sensor 108. The casing 208 may cover the entire tactile sensor 108 with the exception of an opening 202. The opening 202 exposes a portion of the internal components of the tactile sensor 108. The opening 202 may be a portion of a top surface of the tactile sensor 108. As a non-limiting example, the opening 202 may have a 1 mm diameter.

Referring now to FIG. 2B, a cutaway side view of the tactile sensor 108 of FIG. 1 is depicted. Underneath the opening 202 may be the MEMS sensor 210. The MEMS sensor 210 may be a MEMS transducer with integrated signal conditioning and bus interface in a standard surface-mount integrated circuit package. The MEMS sensor 210 may be a capacitive transducer comprising one or more membranes with electrodes on the membranes and/or a substrate. Relative movement of the electrodes modulates the capacitance between them, which then may be detected by the associated electronic circuitry of the MEMS sensor 210, such as sensitive electronic amplifiers.

Figure 2C:
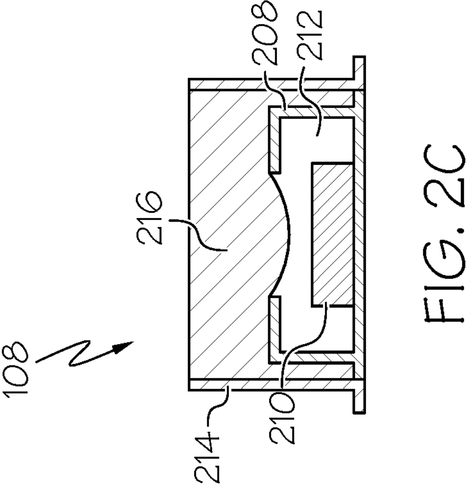
FIG. 2C depicts a cutaway side view of the tactile sensor of FIG. 1 formed in an outer material, according to one or more embodiments shown and described herein.

Referring now to FIG. 2C, a cutaway side view of the tactile sensor 108 of FIG. 1. The tactile sensor 108 may be encapsulated in an outer material 216. The outer material 216 may be any thickness greater than the tactile sensor 108, such as 4 mm, 6 mm, 8 mm, or the like. Encapsulating the tactile sensor 108 in an outer material 216 may help protect the tactile sensor 108 while still allowing contact forces to be transferred to the tactile sensor 108. The outer material 216 may also be used to customize the contact surface of the tactile sensor 108. For example, the outer material 216 may be a compliant material to assist with grasping an object when the tactile sensor 108 is placed on an end effector of a robotic arm. The outer material 216 may further be used to help mount the tactile sensor 108 to the printed circuit board (PCB) (rigid or flexible) (also referred to as a "sensing surface"). One example of an outer material 216 is rubber. Rubber forms a robust and compliant contact surface, which allows the tactile sensor 108 to also be used for grasping and manipulation. A rubber outer material 216 can also effectively communicate contact pressure from the contact surface, through the opening 202, to the MEMS sensor 210.

Referring now to FIG. 2D, another cutaway side view of the tactile sensor 108 of FIG. 1 is depicted. In some embodiments, the outer material 216 may require additional treatment to fully encapsulate the tactile sensor 108 for maximum sensor efficacy. For example, if the tactile sensor 108 is encapsulated via a rubber casting method (with mold 214), air 212 (as shown in FIG. 2C) may become trapped within the casing 208. Rather than remove the casing 208 and thus the protection of sensitive internal components, the tactile sensor 108 may be placed in a vacuum chamber 218 to have any trapped air 212 removed via a vacuum pump. In some embodiments, an array of tactile sensors 108 may be utilized to form an expansive contact surface. In such case, the array of tactile sensors 108 may be encapsulated in a single piece of material, such as rubber.

Figures 3A, 3B:
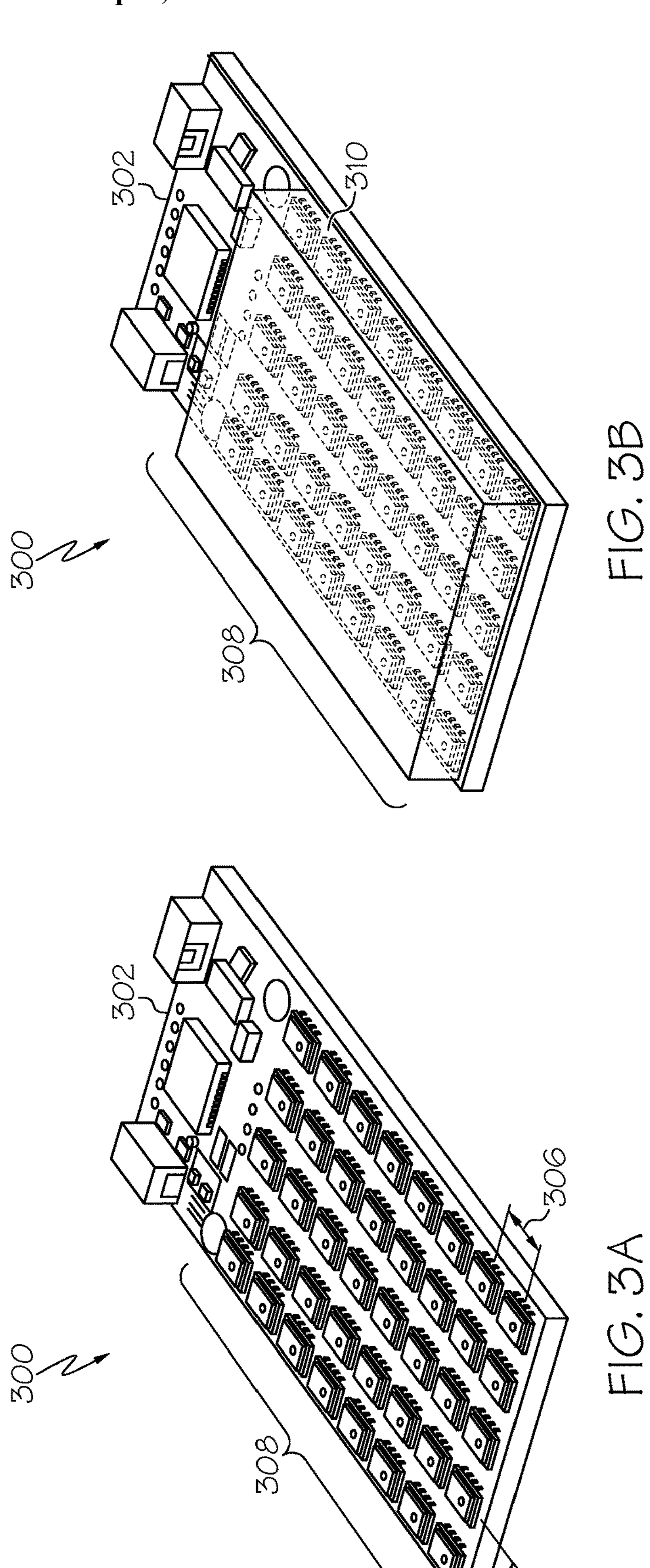
FIG. 3A depicts an array of tactile sensors on a sensing surface, according to one or more embodiments shown and described herein.
FIG. 3B depicts the array of tactile sensors embedded in a rubber molding, according to one or more embodiments shown and described herein.

Referring now to FIG. 3A, an array 300 of tactile sensors 308 on a sensing surface 302 is depicted. Multiple tactile sensors 308 may be communicatively coupled together on the same or separate PCB, such as sensing surface 302. The sensing surface 302 may be rigid or flexible. For example, the sensing surface 302 of FIG. 3A is a rigid surface having multiple tactile sensors 308 communicatively coupled together. A rigid sensing surface 302 may be cut apart for custom designs. The array 300 may also be integrated with flexible PCBs to provide flexible contact sensing. For example, a flexible sensing surface 302 may be used to form a soft skin draped on a robotic arm that can detect contact. It should thus be understood that the shape and form embodiments are not limited to those as shown in FIG. 3A.

To improve the localization and/or accuracy of the sensing, the tactile sensors 308 may be placed close together. As a non-limiting example, each column of tactile sensors 308 may be a first distance 304 such as 7 mm and each row of tactile sensors 308 may be a second distance 306 such as 6 mm. Other distances may be utilized. The first distance 304 and the second distance 306 may be the same or different, depending on the use case. For example, tactile sensors 308 may be placed close together in the first distance 304 when it is expected that most contact forces will be in a lateral direction, along the column of tactile sensors 308. Decreasing the distance between tactile sensors 308 may improve the accuracy of where forces are being detected on the array 300.

Referring now to FIG. 3B, the array 300 of tactile sensors 308 embedded in a rubber molding 310 is depicted. The rubber molding 310, or any other material used instead of rubber, may have a first surface connected to the sensing surface 302 and a second surface that serves as a contact surface for receiving contact forces that are transferred to the tactile sensors 308. The contact surface of the rubber molding 310 may be continuous and/or flat. In some embodiments, the rubber molding 310 may not be continuous, meaning that each tactile sensor 308 of the array 300 may be individually encapsulated (e.g., rubber molded).

An array 300 of tactile sensors 308 encapsulated in a single rubber molding 310 can help facilitate the customization of the contact surface of the array 300, allowing for localized pressure measurement through the various tactile sensors 308. One form of customization of the contact surface of the array 300 includes a plurality of ridges and/or a texture. Ridges, such as those resembling a fingerprint, may be implemented on a contact surface when the array is placed on an end effector. Ridges may improve grip to reduce the amount of slip that may be caused by an otherwise smoother contact surface. In some embodiments, the ridges may be configured to permit certain types of slip by reducing the amount of resistance created when the particular type of slip occurs. For example, a plurality of ridges comprising concentric circles may permit torsional movement of a gripped object while resisting slip movement.

A potential issue with the array 300 is that it is limited to detecting forces normal to the sensing surface 302. A tactile sensor 308 may only detect normal forces, and the tactile sensors 308 of the array 300 are all laid flat along the sensing surface 302. To detect shear forces, the molding 310 may be shaped to translate shear forces into normal forces. The translated normal forces may be detected by particular tactile sensors 308 in the array 300 to sense shear forces. Alternatively, as described further below, the tactile sensors 308 may be arranged to sense shear forces on the contact surface without changing the molding 310.

Figure 4A:
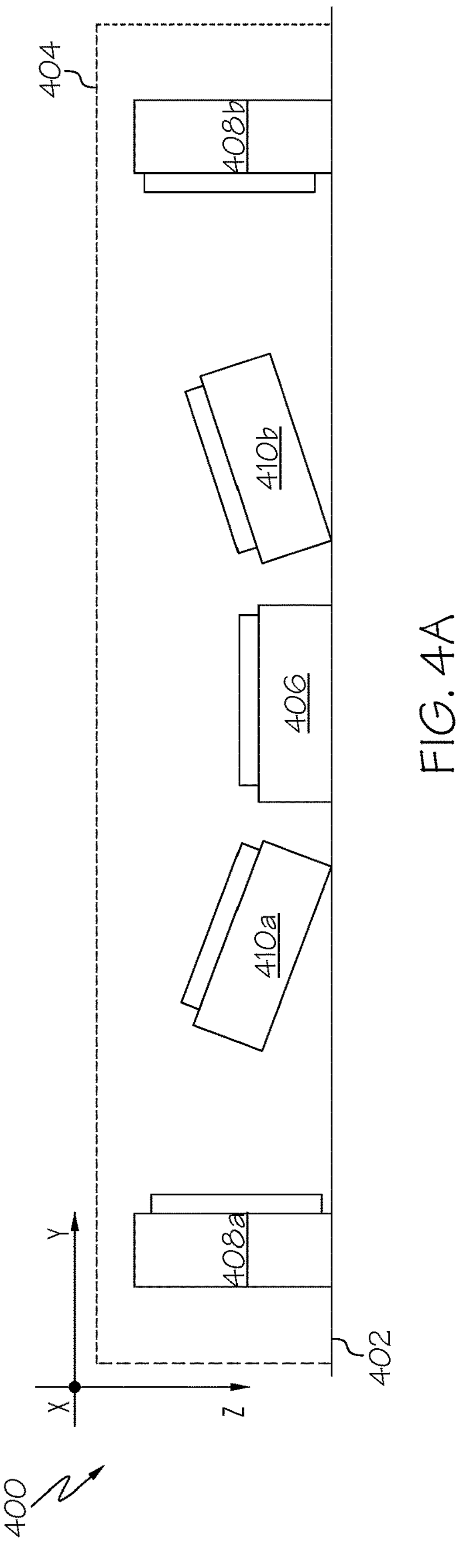
FIG. 4A depicts a cutaway side view of an array of tactile sensors on a sensing surface, according to one or more embodiments shown and described herein.

Referring now to FIG. 4A, a cutaway side view of the array 400 of tactile sensors 406, 408*a*, 408*b*, 410*a*, 410*b* on a sensing surface 402 is depicted. The sensing surface 402 may be any substrate sufficient for hosting the tactile sensors 406, 408*a*, 408*b*, 410*a*, 410*b*. For example, the sensing surface 402 may be a PCB. The sensing surface 402 may be rigid or flexible. As shown in FIG. 4A, the sensing surface 402 is a rigid PCB with the tactile sensors 406, 408*a*, 408*b*, 410*a*, 410*b* mounted in various positions thereon. The array may include at least one pressure sensor is parallel to the sensing surface 402, at least one pressure sensor is angled between parallel and perpendicular to the sensing surface 402, and at least one pressure sensor is perpendicular to the sensing surface 402. It should be understood that the configuration shown and described with regard to FIG. 4A is exemplary and that other configurations are contemplated. For example, multiple tactile sensors 406 that are placed parallel to the sensing surface 402 may be placed throughout the sensing surface 402 wherever normal forces may be expected to be received, and similarly, multiple pairs of tactile sensors 408*a*, 408*b*, 410*a*, 410*b* that are angled may be placed throughout the sensing surface 402 wherever shear forces may be expected to be received, such as between the X and Y axes.

As shown in FIG. 4A, tactile sensor 406 is parallel to the sensing surface 402 (i.e., on-axis), tactile sensors 410*a*, 410*b* are angled between parallel and perpendicular to the sensing surface 402 (i.e., off-axis), and tactile sensors 408*a*, 408*b* are perpendicular to the sensing surface (i.e., off-axis). The tactile sensors 406, 410*a*, 410*b* may be used for detecting forces normal to the sensing surface 402 because they are or are nearly parallel with the sensing surface and may directly receive the normal forces. The tactile sensors 408*a*, 408*b*, 410*a*, 410*b* may be used for detecting shearing forces because they are or are nearly perpendicular to a shearing force, such as along the Y axis. The tactile sensors 408*a*, 408*b*, 410*a*, 410*b* may receive the shearing forces, such as along the Y axis, by the molding 310, which encapsulates the array 400 and transfers forces to the tactile sensors 406, 408*a*, 408*b*, 410*a*, 410*b*. The tactile sensors 410*a*, 410*b* may be angled by configuring their frame and/or the sensing surface 402 to place the tactile sensors 410*a*, 410*b* at the desired angle.

In some embodiments, a sensing device (e.g., sensing device 102 of FIG. 1) connected to the array 400 may utilize machine learning methods to enhance the sensing features of the array 400. For example, the sensing device may utilize a machine learning model to classify a type of force being acted on the array 400. To determine the type of force being acted on the array 400, the machine learning model may be trained with training data having a plurality of features labeled according to their corresponding force. The training data may be used to train a supervised machine learning model such as a neural network, support vector machine, or any other supervised machine learning structure. As the machine learning model receives the training data set, the machine learning model may adjust a set of weights until the model has been fitted appropriately according to the labeled training data set. Training may also or instead include determining a loss function through a gradient descent process, determining a cost function, constructing a decision boundary hyperplane, and/or any other mathematical function. The trained machine learning model may classify data into any number of categories corresponding to the features of the training data set. The sensing device may categorize a force acting on the array 400 based on the detected signals from the array 400, such as normal, shear, and/or the like. The detected signals may be sent to the machine learning model as input. The trained machine learning model may classify the detected signals based on the training data set and output one or more attributes of the movement that created the detected signals. For example, the machine learning model may be trained on multiple surfaces with known slip attributes and label them as having a particular magnitude of slip, and when the trained machine learning model receives a sensor data indicating the particular magnitude, the trained machine learning model may output an indication that the array 400 is receiving a particular force.

As another example, the sensing device may utilize a machine learning model to characterize a surface that the array 400 is in contact with. To determine the type of surface the array 400 is in contact with, the machine learning model may be trained with training data having a plurality of features labeled according to their corresponding surface. The training data may be used to train a supervised machine learning model such as a neural network, support vector machine, or any other supervised machine learning structure. As the machine learning model receives the training data set, the machine learning model may adjust a set of weights until the model has been fitted appropriately according to the labeled training data set. Training may also or instead include determining a loss function through a gradient descent process, determining a cost function, constructing a decision boundary hyperplane, and/or any other mathematical function. The trained machine learning model may classify data into any number of categories corresponding to the features of the training data set. The sensing device may characterize a surface in contact with an array based on the detected signals from the array 400. The detected signals may be sent to the machine learning model as input. The trained machine learning model may classify the detected signals based on the training data set and output one or more attributes of the surface that created the detected signals. For example, the machine learning model may be trained on multiple surfaces with known contact attributes and label them as belonging to a particular type of surface, and when the trained machine learning model receives a sensor data indicating the particular magnitude, the trained machine learning model may output an indication that the array is in contact with a particular type of surface.

Figures 4B, 4C:
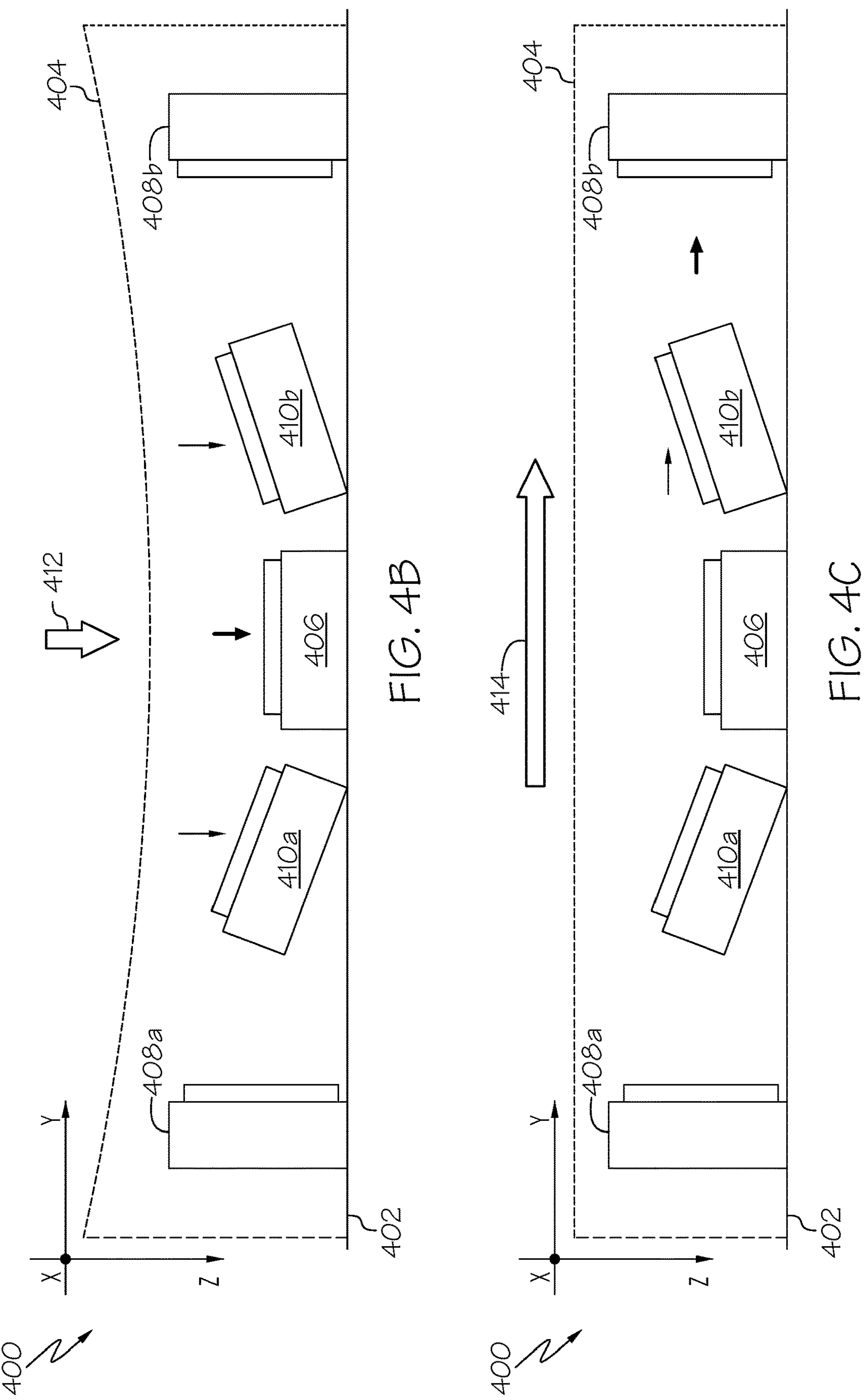
FIG. 4B depicts the cutaway side view of the array of tactile sensors on a sensing surface of FIG. 4A receiving a downward force, according to one or more embodiments shown and described herein.
FIG. 4C depicts the cutaway side view of the array of tactile sensors on a sensing surface of FIG. 4A receiving a shear force, according to one or more embodiments shown and described herein.

Referring now to FIG. 4B, a cutaway side view of the array 400 of tactile sensors 406, 408*a*, 408*b*, 410*a*, 410*b* on a sensing surface 402 of FIG. 4A receiving a downward force 412 is depicted. When configuring the array 400, the tactile sensors 406, 410*a*, 410*b* may be placed under an estimated normal force area, that is, an area where normal forces are likely to occur. For example, in FIG. 4B, the array 400 is likely to receive normal forces is in the middle of the array 400; however, normal forces may be received anywhere else on the array 400 and one or more of the tactile sensors 406, 410*a*, 410*b* may be positioned accordingly. As seen in FIG. 4B, the downward force 412 is a force normal to the sensing surface 402. Accordingly, the downward force

412 may be applied to the casing 404 that transfers the forces onto the tactile sensors 406, 410*a*, 410*b*. Although the downward force 412 is also applied to the tactile sensors 408*a*, 408*b*, the tactile sensors 408*a*, 408*b* are angled perpendicular to the sensing surface 402 so they cannot detect the downward force 412. In some embodiments, one or more of the tactile sensors 406, 410*a*, 410*b* may have different levels of sensitivity for improving the ability of the array 400 to measure the downward force 412. For example, tactile sensors 410*a*, 410*b* may have increased sensitivity for better detection of the downward force 412 to compensate for their angled configuration. In some embodiments, multiple sets of tactile sensors 406, 410*a*, 410*b* may be included in the array 400 for improving the ability of the array 400 to measure the downward force 412. For example, tactile sensor 406 parallel to the sensing surface 402 may also be included between tactile sensors 408*a*, 410*a* as well as between tactile sensors 408*b*, 410*b*.

Referring now to FIG. 4C, the cutaway side view of the array 400 of tactile sensors 406, 408*a*, 408*b*, 410*a*, 410*b* on a sensing surface 402 of FIG. 4A receiving a shear force 414 is depicted. When configuring the array 400, the tactile sensors 408*a*, 408*b*, 410*a*, 410*b* may be positioned along an estimated slipping direction, such as the X and/or Y axes as shown in FIG. 4C. For example, in FIG. 4C, the array 400 is likely to receive shear forces in the Y direction; however, shear forces may be received anywhere else on the array 400 and one or more tactile sensors 408*a*, 408*b*, 410*a*, 410*b* may be positioned accordingly. As seen in FIG. 4C, the shear force 414 is a force parallel to the sensing surface 402. Accordingly, the shear force 414 may be applied to the casing 404 that transfers the forces onto the tactile sensors 408*b*, 410*b*. Although the shear force 414 is also applied to the tactile sensors 408*a*, 410*a*, 406, the tactile sensors 408*a*, 410*a*, 406 are positioned such that they cannot detect the shear force 414. In some embodiments, one or more of the tactile sensors 410*b*, 408*b* may have different levels of sensitivity for improving the ability of the array 400 to measure the shear force 414. For example, tactile sensors 410*b* may have increased sensitivity for better detection of the shear force 414 to compensate for its angled configuration. In some embodiments, multiple sets of tactile sensors 408*b*, 410*b* may be included in the array 400 for improving the ability of the array 400 to measure the shear force 414. For example, tactile sensor 408*b* perpendicular to the sensing surface 402 may also be included along the X axis to detect slip along the X axis.

Figure 5B:
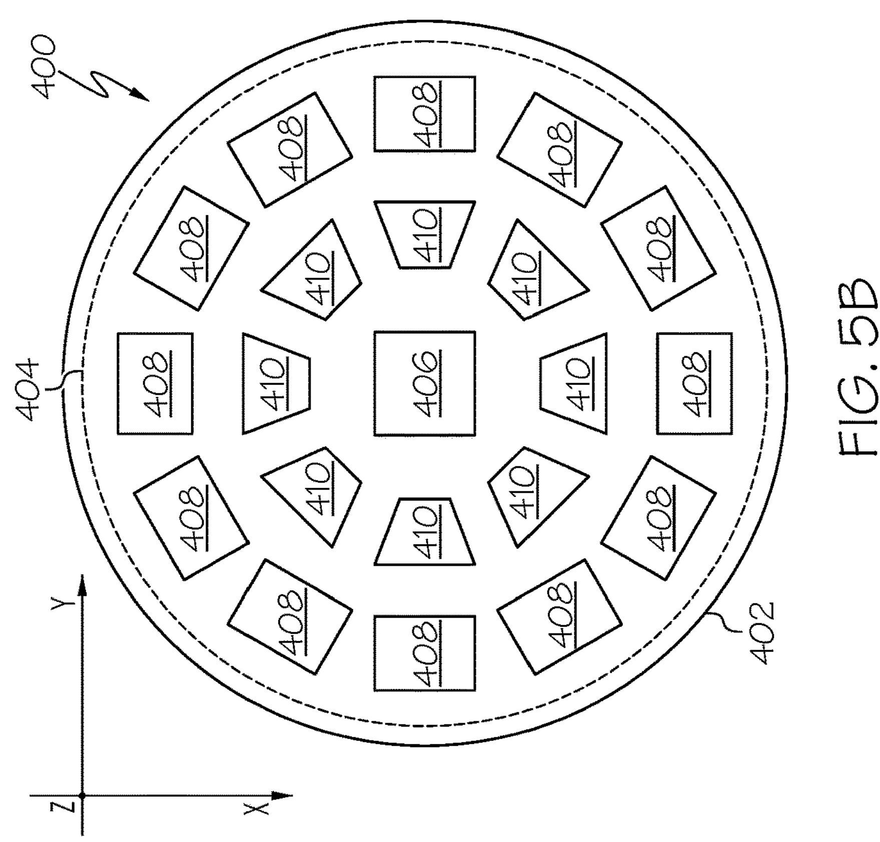
FIG. 5B depicts a top view of an array of tactile sensors in various positions on a round sensing surface, according to one or more embodiments shown and described herein.
Figure 5A:
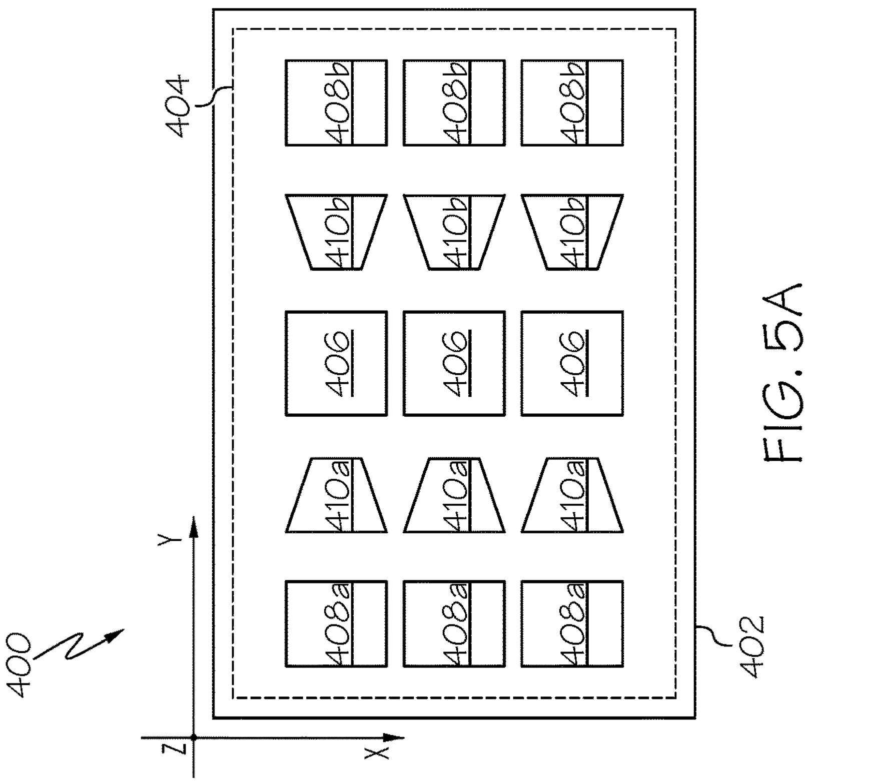
FIG. 5A depicts a top view of the array of tactile sensors of FIG. 4A in various positions on a rectangular sensing surface, according to one or more embodiments shown and described herein.

Referring now to FIG. 5A, a top view of an array 400 of tactile sensors 406, 408*a*, 408*b*, 410*a*, 410*b* of FIG. 4A in various positions on a rectangular sensing surface 402 is depicted. The tactile sensors 406, 408*a*, 408*b*, 410*a*, 410*b* may form a grid on the rectangular sensing surface 402. The grid may be three tactile sensors by five tactile sensors, as shown, although any other configuration may be possible. The angle at which tactile sensors 408*a*, 408*b*, 410*a*, 410*b* face and the degree to which they are angled may depend on the likely direction of forces. Tactile sensors 408*a*, 408*b*, 410*a*, 410*b* that are or are nearly perpendicular to the sensing surface 402 may be used to sense a shear force, and thus should be placed facing a direction opposite the anticipated force. For example, tactile sensor 408*b* is placed on the right side of the array 400 in anticipation of slip in the Y direction; however, slip in the X direction will go undetected as it may not be anticipated.

A rectangular sensing surface 402 may be flexible for use on a robotic arm, where the sensing surface 402 is draped on the robotic arm into a cylinder or any other shape as a sort of robotic skin for detecting contact with the robotic arm. A rectangular sensing surface 402 may also or instead be rigid for use on an end effector, where the end effector is constructed from a rigid sensing surface 402. For example, a sensing surface 402 such as a rigid PCB can be cut apart for custom designs. Some or all of an end effector may also have an array 400. For example, each segment of a finger of a robotic actuator may contain its own array 400. In the case where the array 400 is placed on an end effector of a robotic arm, the casing 404 may be configured to enhance the grip of the end effector. For example, the top of the casing 404 (i.e., the contact surface) may have grooves or ridges for improving grip. The material hardness of the casing 404 may be adapted for particular situations. For example, the casing 404 may be softer for increasing grip, and the sensitivity of the tactile sensors 406, 408*a*, 408*b*, 410*a*, 410*b* may be adjusted accordingly.

The array 400 may contain greater or fewer numbers of tactile sensors 406, 408*a*, 408*b*, 410*a*, 410*b* shown in FIG. 5A. The array 400 may also be larger or smaller than the array 400 shown in FIG. 5A. Additionally, the array 400 may be communicatively coupled to other arrays, which may allow the array 400 to be configured such that it only focuses on sensing slip in a particular direction while another array senses slip in a different direction.

Referring now to FIG. 5B, a top view of an array 400 of tactile sensors 406, 408, 410 in various positions on a round sensing surface 402 is depicted. The tactile sensors 406, 408, 410 may form a grid on the round sensing surface 402. The grid may be one or more tactile sensors 406 surrounded by concentric circles of tactile sensors 408, 410, as shown, although any other configuration may be possible. The angle at which tactile sensors 408, 410 face and the degree to which they are angled may depend on the likely direction of forces. Tactile sensors 408, 410 that are or are nearly perpendicular to the sensing surface 402 may be used to sense a shear force, and thus should be placed facing a direction opposite the anticipated force. For example, a circular arrangement of tactile sensors 408, 410 may be able to detect shear forces in both the X and Y direction.

The round sensing surface 402 may be flexible for use on uneven surfaces. A rectangular sensing surface 402 may also or instead be rigid. For example, an end effector in the shape of a hand may utilize the round sensing surface 402 configuration as a palm of the hand, where the end effector is constructed from a rigid sensing surface 402. Some or all of an end effector may also have an array 400. For example, a tip of a finger of a robotic actuator may contain its own array 400. In the case where the array 400 is placed on an end effector of a robotic arm, the casing 404 may be configured to enhance the grip of the end effector. For example, the top of the casing 404 (i.e., the contact surface) may have grooves or ridges for improving grip. The material hardness of the casing 404 may be adapted for particular situations. For example, when placed on a contact surface, the casing 404 may be softer for increasing grip, and the sensitivity of the tactile sensors 406, 408, 410 may be adjusted accordingly.

The array 400 may contain greater or fewer numbers of tactile sensors 406, 408, 410 shown in FIG. 5B. The array 400 may also be larger or smaller than the array 400 shown in FIG. 5B. Additionally, the array 400 may be communicatively coupled to other arrays, which may allow the array 400 to be configured such that it only focuses on sensing slip in a particular direction while another array senses slip in a different direction.

It should now be understood that embodiments disclosed herein include systems and devices for shear force estimation with off-axis membrane pressure measurement. In embodiments disclosed herein, MEMS barometric pressure sensors may be placed at key angles or even perpendicular to a sensing surface to detect and/or measure shear forces that conventional pressure sensors are not able to detect. For example, the embodiments may include a plurality of pressure sensors arranged on a sensing surface including a first set of sensors, a second set of sensors, a third set of sensors, and others. The first set of sensors may measure forces normal to the surface, the second set of sensors may measure normal and shear forces, and the third set of sensors may measure forces parallel to the surface (i.e., shearing forces).

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A sensor system comprising:

a sensing surface; and an array of pressure sensors arranged on the sensing surface; wherein, at least one pressure sensor is parallel to the sensing surface, at least one pressure sensor is angled between parallel and perpendicular to the sensing surface, at least one pressure sensor is perpendicular to the sensing surface, and the pressure sensors are micro electro mechanical system (MEMS) barometric pressure sensors.

2. The sensor system of claim 1, wherein the array of pressure sensors arranged onto the sensing surface comprises encapsulating the array of pressure sensors onto the sensing surface such that the array of pressure sensors are encapsulated in a single piece of material having a first surface connected to the sensing surface and a second surface.

3. The sensor system of claim 2, wherein the second surface is flat and continuous.

4. The sensor system of claim 2, wherein the second surface has a plurality of ridges.

5. The sensor system of claim 1, wherein the at least one pressure sensor perpendicular to the sensing surface and the at least one pressure sensor angled between parallel and perpendicular to the sensing surface are positioned along an estimated slipping direction.

6. The sensor system of claim 1, wherein the at least one pressure sensor parallel to the sensing surface is positioned under an estimated normal force area.

7. The sensor system of claim 1, wherein the pressure sensors of different angles have different levels of sensitivity.

8. A robotic arm comprising:

a sensing surface; and an array of pressure sensors arranged onto the sensing surface; wherein, at least one pressure sensor is parallel to the sensing surface, at least one pressure sensor is angled between parallel and perpendicular to the sensing surface, at least one pressure sensor is perpendicular to the sensing surface, and the pressure sensors are micro electro mechanical system (MEMS) barometric pressure sensors.

9. The robotic arm of claim 8, wherein the array of pressure sensors arranged onto the sensing surface comprises encapsulating the array of pressure sensors onto the sensing surface such that the array of pressure sensors are encapsulated in a single piece of material having a first surface connected to the sensing surface and a second surface.

10. The robotic arm of claim 9, wherein the second surface is flat and continuous.

11. The robotic arm of claim 9, wherein the second surface has a plurality of ridges.

12. The robotic arm of claim 8, wherein the at least one pressure sensor perpendicular to the sensing surface and the at least one pressure sensor angled between parallel and perpendicular to the sensing surface are positioned along an estimated slipping direction.

13. The robotic arm of claim 8, wherein the at least one pressure sensor parallel to the sensing surface is positioned under an estimated normal force area.

14. The robotic arm of claim 8, wherein the pressure sensors of different angles have different levels of sensitivity.

15. An end effector comprising:

a sensing surface; and an array of pressure sensors arranged onto the sensing surface; wherein, at least one pressure sensor is parallel to the sensing surface, at least one pressure sensor is angled between parallel and perpendicular to the sensing surface, at least one pressure sensor is perpendicular to the sensing surface, the pressure sensors are micro electro mechanical system (MEMS) barometric pressure sensors, and the array of pressure sensors are encapsulated onto the sensing surface such that the array of pressure sensors are encapsulated in a single piece of material having a first surface connected to the sensing surface and a second surface.

16. The end effector of claim 15, wherein the second surface is flat and continuous.

17. The end effector of claim 15, wherein the second surface has a plurality of ridges.

18. The end effector of claim 15, wherein the at least one pressure sensor perpendicular to the sensing surface and the at least one pressure sensor angled between parallel and perpendicular to the sensing surface are positioned along an estimated slipping direction.

19. The end effector of claim 15, wherein the at least one pressure sensor parallel to the sensing surface is positioned under an estimated normal force area.

20. The end effector of claim 15, wherein the pressure sensors of different angles have different levels of sensitivity.

* * * * *